United States Patent [19]

Trantham

[11] 3,952,806

[45] Apr. 27, 1976

[54] METHOD FOR ALTERING PERMEABILITY OF A HYDROCARBON-CONTAINING FORMATION

[75] Inventor: Joseph C. Trantham, Bartlesville, Okla.

[73] Assignee: Phillips Petroleum Company, Bartlesville, Okla.

[22] Filed: June 16, 1975

[21] Appl. No.: 587,181

[52] U.S. Cl. .............................. 166/294; 166/295
[51] Int. Cl.² ...................................... E21B 33/138
[58] Field of Search ............... 166/294, 295, 305 R, 166/292, 273, 274

[56] References Cited
UNITED STATES PATENTS

| | | | |
|---|---|---|---|
| 3,308,885 | 3/1967 | Sandiford | 166/295 |
| 3,481,403 | 12/1969 | Gidley et al. | 166/295 |
| 3,532,168 | 10/1970 | Webb | 166/292 |
| 3,587,737 | 6/1971 | Tosch | 166/294 X |
| 3,604,508 | 9/1971 | Son, Jr. | 166/294 |
| 3,625,284 | 12/1971 | Gogarty et al. | 166/273 |
| 3,648,774 | 3/1972 | Kirk | 166/305 R |
| 3,762,476 | 10/1973 | Gall | 166/294 |
| 3,833,061 | 9/1974 | Gall | 166/294 |

*Primary Examiner*—Stephen J. Novosad

[57] ABSTRACT

A method is provided for altering the permeability of a subterranean hydrocarbon-containing formation penetrated by a wellbore by removing hydrocarbons from the highly permeable portions of the formation followed by plugging of the cleaned portions of the formation with a polymeric gel. A micellar dispersion is passed into the formation followed by a solution or dispersion of a gellable polymer and a solution of aluminum citrate and the well is then closed in for a period of time sufficient for gelling the polymer in situ.

12 Claims, No Drawings

3,952,806

METHOD FOR ALTERING PERMEABILITY OF A HYDROCARBON-CONTAINING FORMATION

BACKGROUND OF THE INVENTION

This invention relates to treatment of a hydrocarbon-containing subterranean formation. In one of its aspects this invention relates to altering the permeability of a subterranean formation. In another of its aspects this invention relates to selectively plugging the more permeable portions of a hydrocarbon-containing formation. In yet another of its aspects this invention relates to cleaning the surfaces of a subterranean formation of hydrocarbons sufficiently to permit interaction of a gellable polymer with the formation surfaces to form an anchored stoppage within the formation.

Water channeling through high permeability zones in an oil reservoir by-passes large quantities of oil and often threatens the life of a water-flood. If the water contains expensive chemical additives, the monetary loss is increased. Decreasing the permeability of high permeability zones is a primary goal of water diversion efforts. Causing a decrease in permeability will cause the pressure to increase at a given point at a given flow rate, forcing the flooding fluids into tighter, oil-bearing sands. Intercommunicating zones in a formation need to be plugged in depth to cause a significant decrease in the bypassing of oil zones.

The economic limit of production wells is often determined by the water-oil ratio, and a goal of water diversion is to decrease this ratio. This goal is reached primarily by decreasing the flow of water directly into the well and secondarily by diverting the water into other oil-bearing zones to increase the oil rate. It can be seen, therefore, that the systems for treating of producing wells must not severely decrease the permeability of the formations to oil. A method for forming a stoppage in the highly permeable portions of a subterranean hydrocarbon-containing formation is an important contribution to the knowledge necessary efficiently to produce hydrocarbons using either injection or production wells.

Long lasting effectiveness of formation plugging with gelled polymer is generally accepted to be a direct function of the adsorption of the polymer on the formation. The present invention includes a procedure for increasing polymer adsorption on reservoir surfaces. I have discovered a method for altering the permeability of a subterranean hydrocarbon-containing formation which employs in combination a means for reducing the oil saturation of the rock followed by the creation of a blockage of the more permeable portions of the formation by gelling a polymer solution or polymer dispersion in situ.

It is therefore an object of this invention to provide a method for altering the permeability of a subterranean hydrocarbon-containing formation. It is another object of this invention to provide a combination of treating the more permeable portions of a hydrocarbon-containing formation to increase the adsorption of polymer on these reservoir surfaces followed by the creation of a blockage in these treated portions of the formation in which adsorption of the blocking materials to the reservoir surfaces is increased.

Other aspects, objects and the advantages of this invention will become apparent from a study of the disclosure and the appended claims.

STATEMENT OF THE INVENTION

In accordance with this invention a method is provided for altering the permeability of a subterranean hydrocarbon-containing formation penetrated by a wellbore by passing into the formation a micellar dispersion followed by a solution or dispersion of a gellable polymer and a solution of aluminum citrate with the well then being closed in for a time sufficient for gelling of the polymer in situ. The term "solution" as used in this specification is meant to include both a solution as normally defined and a useful dispersion of a polymer in an aqueous medium.

In a more specific embodiment of the invention a micellar dispersion, hereafter more fully described, is passed downwardly through a wellbore and outwardly into a preselected location within a subterranean hydrocarbon-containing formation. Thereafter, a solution of a polymer and a solution of aluminum citrate are passed downwardly through the wellbore and outwardly into the formation at the same location. The well is then closed in to maintain the injected materials at the preselected location for a time sufficient for in situ gelling of the polymer in response to the reaction of the polymer in solution with the aluminum citrate in solution. In this way the gelled polymer is positioned at the location in the formation where the permeability of fluids was of a high value so that the flow of fluid through these portions of the formation is restricted during subsequent waterflooding or producing operations.

It is to be understood that it is within the skill of the art, through a study of well logs, to determine the volume of gelled polymer that is desired for creating stoppage for a particular formation. A study of well logs can also indicate the desirability of practicing the invention a plurality of times by the utilizing of packers and selectively injecting materials into different portions of the formation.

Also, it should be understood that the solution of aluminum citrate and the solution of polymer can be added in one or more portions. For example, in one method the solutions of polymer and aluminum citrate can be alternated in as many portions as desired. In the preferred embodiment the solution of aluminum citrate is added between two portions of the polymer solution.

The micellar dispersion is comprised of hydrocarbon, water, surfactant, and optionally cosurfactant and also optionally electrolyte. In addition, other additives such as fluid loss control agents, propping agents, corrosion inhibitors, oxidation inhibitors, bactericides, etc., can be incorporated into the micellar dispersion. Examples of composition include about 2 to about 90 percent, preferably about 30 to about 80 percent by volume of hydrocarbon; about 2 to about 50 percent, preferably about 5 to about 25 percent by volume of aqueous medium; about 4 to about 20 percent or more of surfactant, the surfactant can be 50 percent or more active sulfonate; zero to about 20 percent and preferably about 2 to about 10 percent by volume of cosurfactant; and zero to about 10 percent and preferably about 0.01 to about 5 percent by weight, based on the aqeuous medium, of electrolyte. In operations employing aluminum citrate, it is preferred to operate within a pH range of about 3 to about 7. With other gelling agents, other pH ranges would be individually appropriate.

The hydrocarbon can be crude oil (both sweel and sour crude oil), a partially refined fraction of crude oil such as gas oil, kerosene, straight run gasoline, naphthas, etc.; and a refined fraction of crude oil, individual hydrocarbons such as propane, butane, pentane, heptane, decane, cyclohexane, toluene and the like and mixtures thereof.

The aqueous medium can be soft water, brackish water, or a brine. Where the water contains significant ion concentrations, it is preferred that the ions be compatible with those within the subterranean formation.

The surfactant can be anionic, cationic, and nonionic but is preferably a petroleum sulfonate having an average equivalent weight within the range of about 350 to about 525, and more preferably about 390 to about 460 and most preferably about 410 to about 430. Also, it is preferred that the sulfonate be a monovalent cation-containing petroleum sulfonate.

The cosurfactant can be an alcohol, ester, aldehyde, ketone, amine, or a compound containing the combination of two or more functional groups such as hydroxy, ether, amine, etc., and which contain 1 to about 20 carbon atoms and preferably about 3 to about 16 carbon atoms. The cosurfactant is preferably an alcohol such as 2-propanol, 1- and 2-butanol, the amyl alcohols, 1- and 2-hexanol, or a phenol such as p-nonylphenol, and alcoholic liquors such as fusel oil.

The electrolyte can be an inorganic salt, inorganic base, inorganic acid (preferred where the micellar dispersion is desirably reactive with the reservoir rock), organic base, organic acid, and organic salt.

Fluid loss control agents can be incorporated into the water phase or the hydrocarbon phase of the micellar dispersion. Preferably, the agents are incorporated into the water phase.

Suitable members of the above-described classes of ingredients are combined in proportions which provide a micellar dispersion which is capable of displacing oil from either oil-wet or water-wet formations. Such micellar dispersion compositions are well known in the art.

The polymer is dissolved in a suitable aqueous medium, e.g., soft water, brackish water or brine. This solution can contain a water-soluble antioxidant such as sodium bisulfite. The purest or freshest available water is preferred for reasons of economy.

It is preferred that the polymer concentration in the polymer solution be in the range of about 200 to about 10,000, preferably 500 to about 2,000 parts per million.

Polymers which can be used in the method of this invention are the partially hydrolyzed polyacrylamides, the various carboxyalkyl cellulose ethers, e.g., carboxyethyl cellulose, carboxymethyl cellulose, carboxymethyl hydroxyethyl cellulose and the like polymers containing carboxyl groups and exhibiting significant solubility in water. They are well known in the art and need not be further described here.

The aluminum citrate solution used in the method of this invention comprises aluminum citrate and the aqueous medium which can consist of soft water, brackish water or brine. The purest or freshest available water is preferred for reasons of economy.

Although the aluminum citrate concentration can be varied over a range depending on conditions, it is preferred that the aluminum citrate concentration in the aluminum citrate solution be in the range of about 50 to about 5,000, more preferably 50 to about 500 parts per million of aluminum as aluminum citrate. Lower concentrations of aluminum citrate are undesirable because they would, generally speaking, be insufficient to produce adequate gel. Higher aluminum citrate concentrations are undesirable because there will be a waste of valuable product.

The gelation of carboxyl group-containing polymers with aluminum ions is well known. However, in the context of the present invention wherein a formation is pre-treated with a micellar dispersion prior to contact with the polymer and the aluminum citrate, it is believed that something more than simple aluminum-carboxyl bonding is involved.

In the method of this invention, it is preferred that ion ratios of $Al^{+++}/COO^-$ in the range of from about 1/1 to about 4/1 be used. The ratio of the volume of the aluminum citrate solution to the volume of the polymer solution will depend upon their respective concentrations but is conveniently in the range of about 1.1/1 to about 1/1. A lower ratio is undesirable because, for economic reasons, it is best to insure complete utilization of the more expensive component, the polymer. Additionally, the total volume of the aluminum citrate slug plus the polymer slug should effectively equal the pore volume to be treated.

In the method of this invention, it is preferred that the volume of micellar dispersion slug be at least 2 to 15 percent of the pore volume to be treated. The utilization of less micellar dispersion slug relative to the volume of the polymer slug is undesirable because it would not afford proper adsorption of the polymer.

During injection of the micellar solution, the polymer solution and the aluminum citrate solution into the formation, it is preferred that the injection of these materials be maintained at generally a common pressure in order to assure that all of the injected materials are being injected into the same general portions of the formation. If pressures are allowed to vary considerably during injection, other portions of the formation may break down and receive portions of the total treating material.

A calculated illustrative example treatment by the method of this invention is as follows:

EXAMPLE

A high permeability zone 2 feet thick, extending radially from an injection well for 100 feet has a porosity of 30 percent and a residual oil saturation of 10 percent. The total pore volume to be treated is 3357 bbl since the micellar solution will remove the oil entirely. A 5 percent (of pore volume) portion of micellar solution is 168 bbl and has the following composition:

| Solution I Micellar Dispersion Constituents | Volume |
|---|---|
| 39° API Crude Oil | 120 barrels |
| Petroleum Sulfonate (420 Equiv. Wt.) | 17 barrels |
| Mineral Oil (Sulfonate Diluent) | 8 barrels |
| Water | 12 barrels |
| Ethylene Glycol Monobutyl Ether (cosurfactant) | 11 barrels |
| Total | 168 barrels |

| Solution II Polymer Solution "A" Constituents | Volume |
|---|---|
| Dow Pusher 700[1] | 285 parts per million |
| Water (preferably fresh) | 1120 barrels |

[1]Dow Pusher 700 is a polyacrylamide of approximately 5,500,000 molecular weight and of approximately 19% degree of hydrolysis.

Solution III Aluminum Citrate Solution

-continued

Solution I Micellar Dispersion

| Constituents | Volume |
|---|---|
| Aluminum (as citrate) | 60 ppm |
| Water (preferably fresh) | 1120 barrels |

Solution IV Polymer Solution "B"

| Constituents | Volume |
|---|---|
| Dow Pusher 700 | 285 parts per million |
| Water (preferably fresh) | 1120 barrels |

Injection pressure is maintained substantially constant. Solutions I–IV are injected sequentially and each of solutions II to IV immediately following the preceding solution.

In one prior art method, the polymer solution is preceded by an oxidizing agent to condition the formation. While effective, this procedure has some disadvantages. In treating the formation to alter the permeability, the entire reservoir presents a reducing atmosphere which will consume oxidizing agents, while only the actual crude oil components covering the sand particles is a target of the oxidizer.

On the other hand, the micellar solution of the present invention is a powerful solvent for crude oil. The sand or formation faces will thus be cleaned of oil by the micellar solution thereby providing for polymer absorption even in the absence of an oxidizing agent. This will then allow the establishment of in situ gelling of polymer for producing high residual resistance factor and a fluid diversion. Further, it is not necessary in this invention to inject enough micellar solution to react sacrifically with the entire high permeability zone because the removed organic components will be pushed ahead of the micellar solution while said solution maintains its integrity.

Other modifications and alterations of this invention will become apparent to those skilled in the art from the foregoing discussion and it should be understood that this invention is not to be unduly limited thereto.

I claim:

1. A method for altering the permeability of at least a portion of a subterranean hydrocarbon-containing formation penetrated by a wellbore, comprising:
   1. passing a micellar dispersion downwardly through the wellbore and outwardly into the formation;
   2. passing a polymer solution having at least one contacting aluminum citrate solution downwardly through the wellbore and outwardly into the formation to a preselected location; and
   3. closing the well for a period of time sufficient for gelling the polymer in situ.

2. A method as set forth in claim 1, wherein the micellar dispersion, the injected polymer solution, and aluminum citrate solution are injected into the formation at generally common pressures.

3. A method, as set forth in claim 2, wherein the micellar solution contains an inorganic electrolyte, said inorganic electrolyte being an inorganic acid such that the pH of the aqueous phase of the micellar dispersion has a pH value in the range of about 3 to about 7.

4. A method, as set forth in claim 1, wherein the micellar dispersion contains about 2 to about 90 percent by volume hydrocarbon, about 2 to about 50 percent by volume aqueous medium, and about 4 to about 20 percent by volume surfactant, and optionally about zero to about 20 percent by volume cosurfactant and about zero to about 10 percent by weight based on the aqueous medium, electrolyte.

5. A method, as set forth in claim 1, wherein the micellar dispersion contains an aqueous phase having a pH in the range of about 3 to about 7.

6. A method, as set forth in claim 1, wherein the hydrocarbon-containing formation is oil-wet.

7. A method, as set forth in claim 1, wherein the aqueous phase of the micellar dispersion contains a fluid loss agent.

8. A method, as set forth in claim 1, wherein the polymer solution comprises: the polymer present in a suitable aqueous medium.

9. A method, as set forth in claim 1, wherein the polymer concentration of the polymer in the polymer solution is in the range of about 200 to about 10,000 parts per million.

10. A method, as set forth in claim 1, wherein the aluminum citrate solution comprises aluminum citrate and water, said aluminum citrate being at a concentration in the range of about 50 to about 5000 parts per million of aluminum as aluminum citrate.

11. A method, as set forth in claim 1, wherein the ratio of the volume of polymer solution to volume of aluminum citrate solution is in the range of about 1.1/1 to about 1/1, for ion ratios of $Al^{+++}/COO^-$ of about 1/1 to about 4/1.

12. A method, as set forth in claim 1, wherein the volume of the micellar solution is about 2–15 percent of the pore volume to be treated.

* * * * *